US010298528B2

(12) United States Patent
Chi et al.

(10) Patent No.: US 10,298,528 B2
(45) Date of Patent: May 21, 2019

(54) TOPIC THREAD CREATION

(71) Applicant: Flipboard, Inc., Palo Alto, CA (US)

(72) Inventors: Sang Chi, Burlingame, CA (US); H L Peter Shu, San Jose, CA (US); Colin Brian DuRant, San Francisco, CA (US); Christopher Kennedy Casey Allen, Mountain View, CA (US)

(73) Assignee: Flipboard, Inc., Palo Alto, CA (US)

( * ) Notice: Subject to any disclaimer, the term of this patent is extended or adjusted under 35 U.S.C. 154(b) by 633 days.

(21) Appl. No.: 15/014,989

(22) Filed: Feb. 3, 2016

(65) Prior Publication Data

US 2017/0220580 A1    Aug. 3, 2017

(51) Int. Cl.
*G06F 7/00*       (2006.01)
*G06F 17/30*      (2006.01)
*H04L 12/58*      (2006.01)

(52) U.S. Cl.
CPC ........ *H04L 51/16* (2013.01); *G06F 17/30973* (2013.01); *H04L 51/32* (2013.01)

(58) Field of Classification Search
CPC ........... G06F 17/3053; G06F 17/30601; G06F 17/2705; H04L 51/16; H04L 43/106; H04L 51/32
USPC ........................................................ 707/730
See application file for complete search history.

(56) References Cited

U.S. PATENT DOCUMENTS

| | | | | |
|---|---|---|---|---|
| 7,962,550 | B2* | 6/2011 | Banatwala | G06Q 10/107 709/204 |
| 8,990,200 | B1 | 3/2015 | Christensen et al. | |
| 9,177,066 | B2* | 11/2015 | Jain | G06F 17/30867 |
| 2005/0125422 | A1* | 6/2005 | Hirst | G06F 17/2725 |
| 2005/0149621 | A1* | 7/2005 | Kirkland | H04L 51/04 709/207 |
| 2006/0112392 | A1* | 5/2006 | Zhang | H04L 51/26 718/102 |
| 2009/0043814 | A1* | 2/2009 | Faris | G06F 17/30038 |
| 2009/0222551 | A1* | 9/2009 | Neely | G06F 17/30864 709/224 |
| 2009/0287642 | A1* | 11/2009 | Poteet | G06Q 30/02 |
| 2010/0257186 | A1* | 10/2010 | Dewar | G06F 17/30675 707/749 |
| 2012/0072507 | A1* | 3/2012 | Chen | H04L 12/1836 709/206 |
| 2012/0158753 | A1* | 6/2012 | He | G06F 17/30867 707/752 |

(Continued)

*Primary Examiner* — Binh V Ho
(74) *Attorney, Agent, or Firm* — Fenwick & West LLP (57) ABSTRACT

A digital magazine server receives user comments on content items of a digital magazine and generates comment threads. A comment thread has one or more user comments associated with a content item and at least one topic. A topic thread on a selected topic includes one or more comment threads related to the selected topic. To select comment threads for a topic thread based on the selected topic, the digital magazine server determines the relevance of the topic of each comment thread to the topic of the topic thread and determines the quality of the comment thread based on a plurality of quality factors such as number of comments and timestamps of the comments in a comment thread. The digital magazine server aggregates the comment threads based on at least one of topic relevance determination and thread quality determination and selects comment threads based on the aggregation.

18 Claims, 4 Drawing Sheets

(56) References Cited

U.S. PATENT DOCUMENTS

| | | | |
|---|---|---|---|
| 2012/0173508 A1* | 7/2012 | Zhou | G06F 17/30864 |
| | | | 707/709 |
| 2013/0298000 A1* | 11/2013 | Zuccarino | G06F 17/2235 |
| | | | 715/205 |
| 2014/0181194 A1* | 6/2014 | Sullivan | H04L 67/22 |
| | | | 709/204 |
| 2014/0201270 A1* | 7/2014 | Hansen | H04L 51/12 |
| | | | 709/204 |
| 2014/0280236 A1* | 9/2014 | Faller | G06F 17/3053 |
| | | | 707/749 |
| 2014/0379818 A1* | 12/2014 | Cudak | H04L 51/16 |
| | | | 709/206 |
| 2015/0033112 A1* | 1/2015 | Norwood | G06F 17/241 |
| | | | 715/230 |
| 2015/0074033 A1* | 3/2015 | Shah | G06N 5/02 |
| | | | 706/46 |
| 2015/0089358 A1* | 3/2015 | Li | G06F 3/0485 |
| | | | 715/273 |
| 2015/0142888 A1* | 5/2015 | Browning | H04L 12/1831 |
| | | | 709/204 |
| 2016/0292288 A1* | 10/2016 | Walton | G06F 17/30699 |
| 2017/0139921 A1* | 5/2017 | Ball | G06F 17/3053 |
| 2017/0142044 A1* | 5/2017 | Ball | H04L 51/12 |

\* cited by examiner

TOPIC THREAD CREATION

BACKGROUND

This invention generally relates to displaying content presented by a digital magazine server, and more particularly to creating a topic thread around a selected topic that aggregates multiple threads of user-generated comments relating to various content items.

Many online services allow users to post comments. Comments are often posted in association with content items (e.g., a video or news article), allowing users to discuss the content items. The online service to which users post comments displays the comments to other users. By viewing comments on a content item, a user can see how other users are responding to the content item. However, the conventional means of displaying comments in an online system often restricts a user to viewing comments associated with a single content item. A user who seeks to view comments relating to an overarching topic would need to manually seek out content items relating to that topic and view the comments of each content item. Furthermore, conventional solutions to presenting comments often fail to collect and present content items and associated comments on the content items that are likely of interest to users.

SUMMARY

Embodiments of the invention provide a digital magazine to a user, where the user can interact with content items of the digital magazine, such as posting comments on the content items. A digital magazine server is configured to receive comments from users in association with content items presented to users in digital magazines and generate one or more threads of comments (also referred to as "comment thread"). Comment threads, each of which includes one or more comments associated with a content item of a digital magazine, have one or more associated topics. A topic thread is a thread around a selected topic, and the topic thread has one or more comment threads selected based on one or more selecting criteria such as topic relevance and quality of comment thread. In one embodiment, to select comment threads for the topic thread based on the select topic, the digital magazine server determines the relevance of the topic of each candidate comment thread to the topic of the topic thread. The digital magazine server also determines the quality of the comment thread based on a plurality of factors describing the quality of the comment thread, including, e.g., a number of the comments in the comment thread, timestamps of the comments and source of the comments. The digital magazine server aggregates the comment threads based on topic relevance, comment thread quality, or combination of both determinations. Based on this aggregation, comment threads are selected for inclusion in the topic thread and displayed to users of the digital magazine.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict a preferred embodiment of the invention for purposes of illustration only. One skilled in the art will readily recognize from the following discussion that alternative embodiments of the structures and methods illustrated herein may be employed without departing from the principles of the invention described.

DETAILED DESCRIPTION

A digital magazine server retrieves content from one or more sources and generates a personalized, customized digital magazine for a user based on the retrieved content. The generated digital magazine is received by a digital magazine application executing on a client device (such as a mobile communication device, tablet, computer, or any other suitable computing system) of the user. The application presents the digital magazine to the user and receives actions from the user with content presented by the application. A digital magazine includes digital content items, also referred to as "articles", which may include textual articles, pictures, videos, audio, user-generated content (e.g., content posted on a social networking system), advertisements, and any other types of content capable of display within the context of a digital magazine.

The user of the digital magazine can take actions with content items of the digital magazine. Example actions by the user include: accessing a content item, sharing a content item with another user of the digital magazine server, and providing a comment associated with a content item. Additionally, the digital magazine application executing on the user's client device allows the user to exchange messages, e.g., comments on a content item and replies to the comments, with other users of the digital magazine server and maintain various threads of comments associated with the user that includes comments between the user and one or more additional users. The user actions with the application are communicated to the digital magazine server, which selects threads of comments on various topics that are likely of interest to the user.

In order to present users with content items likely of interest to them, the digital magazine server can index content items. For example, an indexed content item includes information about various content items, such as topic, author, source, creation data/time, user comments information, or other information related to the content items. A topic of a content item can be represented by key terms, phrases associated with the content item, which describe certain characteristics of the content item. Multiple content items may be associated with a common topic or associated with similar topics. Examples of topics may describe famous people, sports teams, cities, movies, television shows, books, current events, geographical sites, ideologies, academic fields, and technical compilations.

Users of the digital magazine server may post comments on content items. A comment may include a string of text characters. In some embodiments, comments may also include metadata tags, images, videos, or links to resources. From the comments associated with a content item, the digital magazine server can create and maintain a thread of comments, and the digital magazine server aggregates multiple threads of comments to create a topic thread around a selected topic. The digital magazine server presents the topic thread and associated user comments to the digital magazine application executing on the client device of the user for presentation.

Figure 1:
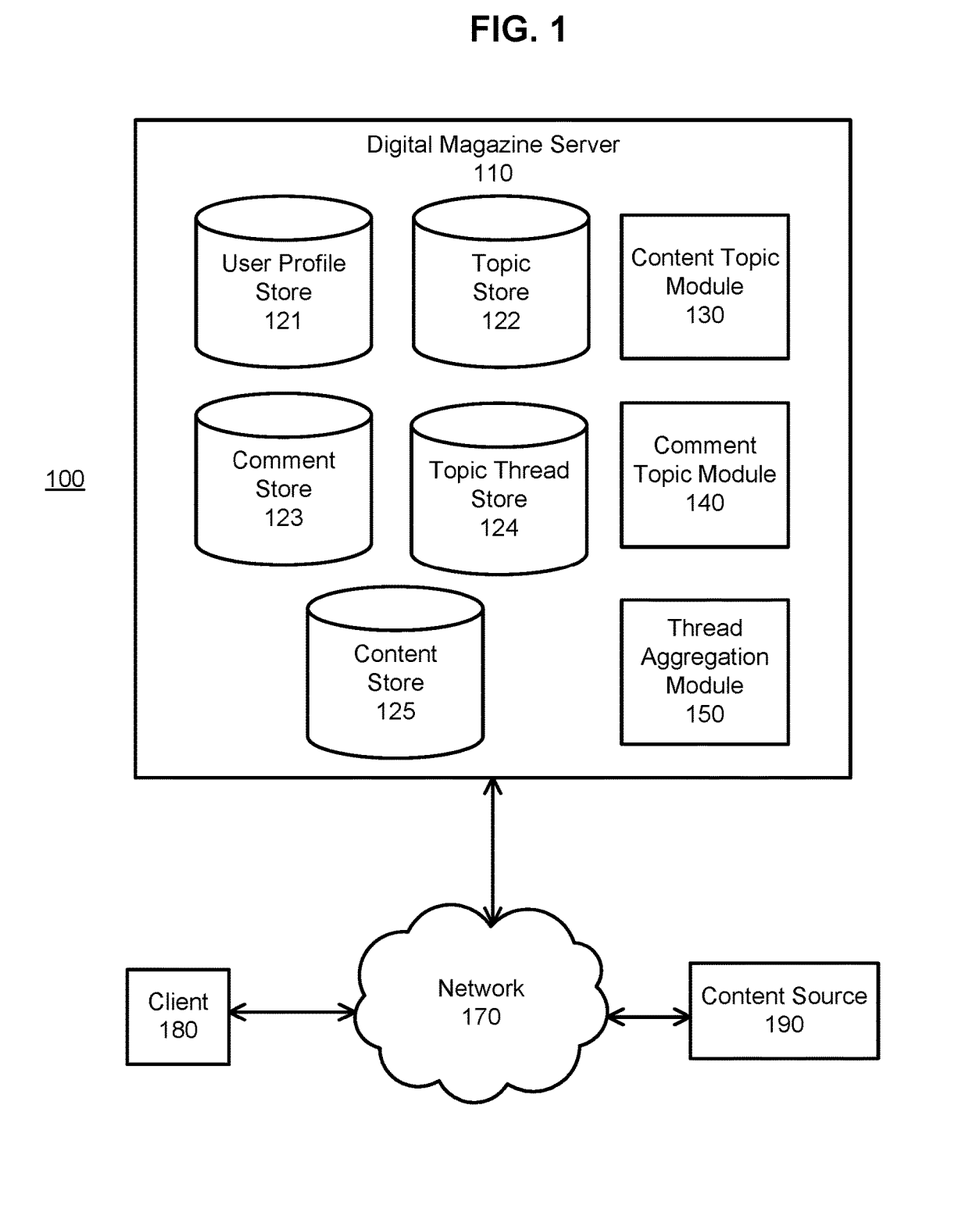
FIG. 1 illustrates a system environment in which a digital magazine server operates according to one embodiment.

FIG. 1 illustrates a system environment 100 in which a digital magazine server operates according to one embodiment. The system environment 100 shown by FIG. 1 includes a digital magazine server 110, a network 170, a client 180, and a content source 190. In alternative configurations, different and/or additional components may be included in the system environment 100. The embodiments described herein can be adapted to online systems that are not digital magazine servers 110.

The client 180 communicates with the content source 190 and the digital magazine server 110 through the network 170, which is typically the Internet. However, the network 170 can be any network, such as a local area network (LAN), a metropolitan area network (MAN), a wide area network (WAN), a wired or wireless network, a private network, or a virtual private network, or some combination thereof. In some embodiments, all or some of the communication links of the network 170 may be encrypted using any suitable technique or techniques.

The content source 190 is a computing system that provides various types of content, such as text, digital images, videos, or audio, to the client 180 and the digital magazine server 110. A content item may be provided by publishers, such as stories about news events, product information, entertainment, or educational material. A content item may also be user-generated, such as a blog, a shared image, an album of shared image, a video, an audio file, or a social networking post. For convenience, content from a source, regardless of its composition, may be referred to herein as an "article," a "content item," or as "content." A content item may include various types of content elements such as text, images, video, interactive media, links, or a combination thereof.

The client 180 is a computing device capable of receiving user input as well as transmitting and/or receiving data via the network 170. The client 180 may be, for example, a personal computer, a digital assistant, a personal digital assistant, a cellular phone, a mobile phone, a smart phone, or a laptop computer. In one embodiment, the client device 180 executes an application allowing a user of the client device 180 to interact with the digital magazine server 110. For example, an application executing on the client device 180 communicates instructions or requests for content items to the digital magazine server 110 to modify content presented to a user of the client device 180. For example, a client 180 allows a user to interact with the digital magazine server 110 by viewing content items, commenting on content items, and providing comments and viewing comments from other users of the digital magazine server 110.

As another example, the client device 180 executes a browser that receives threads of comments on content items from the digital magazine server 110 and presents the threads of comments to a user of the client device 180. In another embodiment, the client device 180 interacts with the digital magazine server 110 through an application programming interface (API) running on a native operating system of the client device 180, such as IOS® or ANDROID™. In various embodiments, any number of client devices 180 may communicate with the digital magazine server 110. Different client devices may have different characteristics such as different processing capabilities, different connection speeds with the digital magazine server 110 over the network 170, and different device types (e.g., make, manufacture, or version).

The digital magazine server 110 receives content items from the content source 190, generates pages in a digital magazine by processing the received content, and provides the pages to the client device 180. Additionally, the digital magazine server 110 receives comments on content items of the digital magazine from a user of the client 180 and other users of the digital magazine server 110, generates threads of comments (also referred to as "comment threads") on various topics based on the received comments, and provides a topic thread that aggregates the comment threads to the client 180. In the embodiment shown by FIG. 1, the digital magazine server 110 includes a user profile store 121, a topic store 122, a comment store 123, a topic thread store 124, a content store 125, a content topic module 130, a comment topic module 140, and a thread aggregation module 150. In other embodiments, the digital magazine server 110 may include additional, fewer, or different components for various applications. For example, the digital magazine server 110 may also include an interface module for receiving user interactions with content items presented to the user and for formatting a topic thread for presentation to a user.

A user of the digital magazine server 110 can be associated with a user profile, which is stored in the user profile store 121. A user profile includes declarative information about the user that was explicitly shared by the user and may also include profile information inferred by the digital magazine server 110. In one embodiment, a user profile includes multiple data fields, each describing one or more attributes of the corresponding user of the digital magazine server 110. Examples of information stored in a user profile include biographic, demographic, and other types of descriptive information, such as work experience, educational history, gender, hobbies or preferences, and geographic location. A user profile may also include a list of topics in which a user has indicated interest based on user's interactions with content items and comments on the content items presented to the user. This list of topics can be used to determine what content items to present to the user. The user profile may include a username and a user icon or avatar to display with comments posted by the corresponding user.

A user profile may also include information about the user's interactions with other users of the digital magazine server 110 and with content items of the digital magazine presented to the user. Example actions by the user with content items presented by the digital magazine application executing on the user's client device 180 include: accessing a content item, viewing a content item, sharing a content item with another user of the digital magazine server 110, saving a content item to the client device 180, providing a comment associated with a content item, and providing a content item to the digital magazine server 110.

Additionally, a user profile includes the user's interactions with other users of the digital magazine server 110 based on messages exchanged between the user and other users and various threads associated with the user that include messages between the user and one or more additional users as well as information identifying the user and other users associated with the user. In one embodiment, the messages between two users are comments on a content item initially posted by one of the users and replies to the comments made by the other user.

The topic store 122 stores a catalog of different topics. Topics may be predetermined or may be generated from various data sources, such as webpages and publically available social networking sources, by the digital magazine server 110. A content item of a digital magazine can be related to a particular topic; a topic of a content item can be represented by key terms, phrases associated with the content item, which describe certain characteristics of the content item, such as famous people, sports teams, cities, movies, television shows, books, current events, geographical sites, ideologies, academic fields, etc. Multiple content items may be associated with a common topic or associated with similar topics; topics with similar names are differentiated based on the context in which each topic is used. Example embodiments of generating topics from various data sources and differentiating topics with similar names by the digital magazine server 110 are described in the U.S. patent application Ser. No. 12/896,700, filed Oct. 1, 2010, which is hereby incorporated by reference herein in its entirety.

The comment store 123 stores user-generated comments on content items presents to users and replies to the comments from users of the digital magazine server 110. Each comment is associated with a content item. The comments associated with a content item are grouped into a comment thread by the digital magazine server 110 and stored in the comment store 123. In one embodiment, the comments of a thread are stored according to a hierarchical structure, such as a tree, in which each comment is a node of the tree. A comment which is a reply to another comment is linked to the comment being replied to in the tree. The comment store 123 may also store a reference to the user profile of the user who posted a given comment, the time the comment was posted, and a reference to another comment that was a reply to a comment, and/or a list of other comments that replied to the comment.

The digital magazine server 110 also includes a topic thread store 124, which stores topic threads. A topic thread is a thread of comments around a selected thread topic, which is aggregated from the comment threads of one or more content items. In one embodiment, the topic threads are generated by the thread aggregation module 150, which is further described below with reference to FIG. 5 and FIG. 6.

Figure 2:
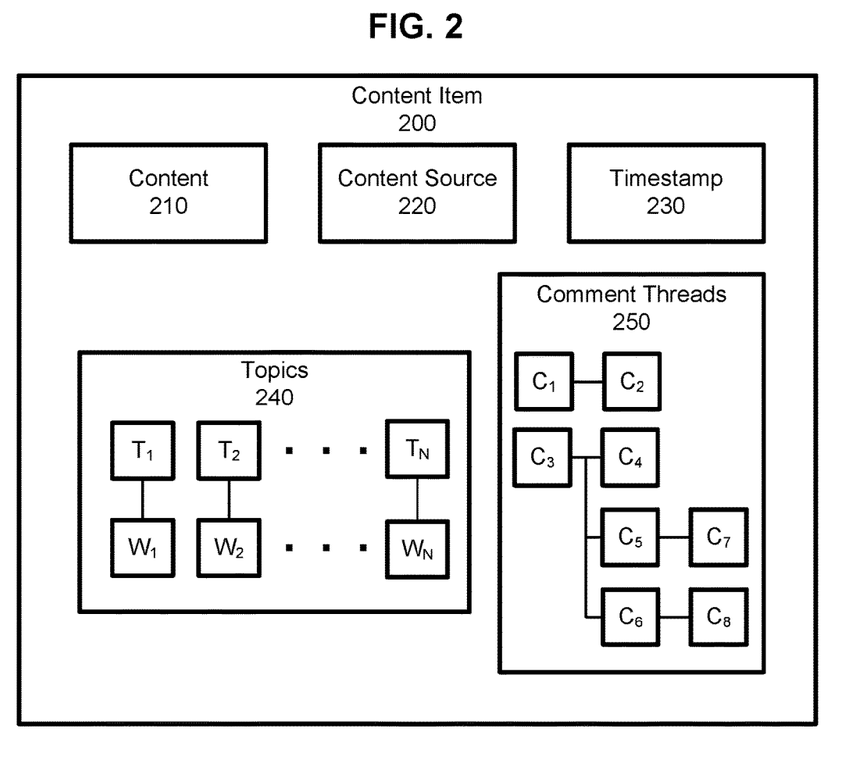
FIG. 2 illustrates an example of a content item of a digital magazine according to one embodiment.

The content store 125 stores content items or references to content items of digital magazines, such as Uniform Resource Locators (URLs) to content items. An example content item 200 and its related components are illustrated in FIG. 2. The components of the content item 200 shown by FIG. 2 include content 210, a content source 220, a timestamp 230, topics 240, and one or more comment threads 250. The content item 200 may include additional or different components from those shown in FIG. 2 in other embodiments.

The content 210 includes content data of the content item 200 presented to a user in a digital magazine, such as images, media, or text, or a combination of thereof. The content 210 of the content item 200 can be provided indirectly by sending the URL address of the content item 200 to a client 180, which retrieves the content from the content source 190 referenced by the URL address.

The content source 220 is a field, which indicates the source of the content 210. The content source 220 may also be a reference to a publisher of the content or the user profile of a user who uploaded the content. The timestamp 230 is a field which stores the time (e.g., calendar date, hour, minute, and second) that the content 210 was received from the content source, or was originally published. The timestamp 230 may also store times when the content 210 was edited (e.g., a correction to a news article issued by the content source). Additionally, for each comment on the content item 200, the timestamp 230 also stores times when the comment was posted.

The content item 200 is associated with one or more topics 240, e.g., a set of topics $\{T_1, \ldots, T_N\}$ and a set of associated weights $\{W_1, \ldots, W_N\}$. In one embodiment, the topics 240 $T_1, \ldots T_N$ of the content item 200 are determined by the content topic module 130, as discussed further below. Each of the topics 240 (e.g., $T_i$, where $1 \leq i \leq N$) has an associated weight (e.g., $W_1$) determined by the content topic module 130. The weight $W_i$ of a given topic $T_i$ corresponds to degree to which the content item 200 relates to the topic $T_i$, or an estimated likelihood that the content item 200 relates to the topic $T_i$.

The content item 200 has one or more associated comment threads 250. In one embodiment, the comment threads 250 are organized according to a hierarchical tree structure. For example, the content item 200 shown in FIG. 2 has eight comments: $C_1, \ldots, C_8$. Comments $C_1$ and $C_3$ are not replies to any other comments and are denoted herein as "root comments." A comment that is a reply to a first comment is denoted herein as a "child" of the first comment; a child comment may have one or more other child comments and collectively referred to as the "descendants" of a root comment. For example, comment $C_2$ is a child of comment $C_1$ and comments $C_4, \ldots, C_8$ are descendants of comment $C_3$.

The hierarchical structure of comments may be determined based on explicit input from users (e.g., pressing a reply button associated with another user's comment and subsequently entering a comment), or based on implicit relationships between comments. For example, a comment $C_a$ may be determined to be a reply of a comment $C_b$ if $C_a$ includes a metadata tag associated with the username of the user who posted $C_b$ or if $C_b$ includes a portion of text that is substantially the same as a portion of $C_a$.

One or more comments on a content item forms a comment thread; each comment thread is associated with a topic. Multiple comment threads on a same content item can be associated with different topics. An individual comment having no child comments, e.g., replies to the comment, constitutes a comment thread having one comment. For example, for the content item 200 illustrated in FIG. 2, the comment threads 250 include: the comment thread of comments $\{C_1, C_2\}$, the comment thread of comments $\{C_3, C_4\}$, the comment thread of comments $\{C_3, C_5, C_7\}$, the comment thread of comments $\{C_3, C_6, C_8\}$, and the comment thread of comments $\{C_3, C_4, C_5, C_7, C_6, C_8\}$. Each of the 5 comment threads of the content item 200 can be related to same, similar or different topics. Determining a topic of a comment thread of a content item is further described below with reference to FIG. 4.

In some embodiments, users can provide feedback to a comment. For example users may "like" a comment or "dislike" a comment. "Disliking" a comment indicates a negative feedback associated with the comment. The number of likes and dislikes received from users can be stored for each comment. Similarly, a user may "report" a comment which indicates that the comment violates community guidelines (e.g., the comment is obscene, contains hate speech, or is spam).

The content item 200 may also include a title and a thumbnail image. The title may be, for example, the headline of an article, the title of a written work, or the title of a video.

The thumbnail may be a smaller version of an image derived from an image present in an article, a frame of a video, or an image in a gallery of images. The titles and thumbnails of multiple content items may be displayed in a UI concurrently allowing a user to select between the content items in order to view it.

Content Topic Determination

Figure 3:
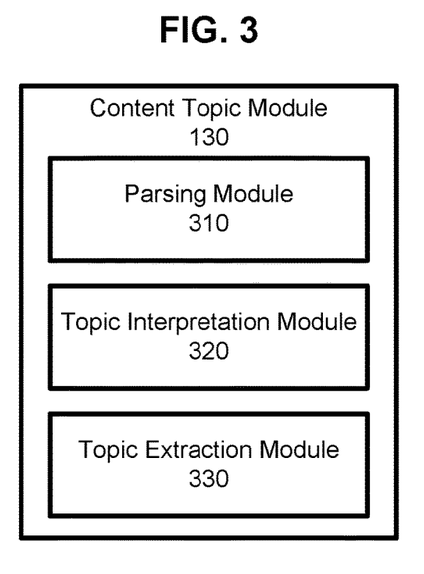
FIG. 3 is an example of a content topic module according to one embodiment.

Returning back to FIG. 1, the content topic module 130 determines one or more topics of a content item by analyzing the content item. The set of topics determined for a content item may be selected from the catalog of topics stored in the topic store 122 of the digital magazine server 110. FIG. 3 is an example of a content topic module 130 according to one embodiment. The content topic module 130 includes a parsing module 310, a topic interpretation module 320, and a topic extraction module 330.

The parsing module 310 parses the text of a content item based on the words in the text of the content item and the semantic relations between the words. In one embodiment, the parsing module 310 parses the text into semantic tokens. A semantic token can be a word, phrase, or other combinations of words. The parsing module 310 determines the syntactic relationships between the semantic tokens representing each sentence of the text of the content item. As an example, the sentence "Berkeley argued for immaterialism" may be parsed into a tuple containing semantic tokens corresponding to the noun "Berkeley", the verb "to argue", the preposition "for", and the noun "Immaterialism." The parsing module 310 identifies the noun "Berkeley" as the subject of the sentence and identifies the preposition "for" and the noun "Immaterialism" as a prepositional phrase that acts as an adverbial clause.

After the text of a content item (e.g., content item 200) is parsed, the topic interpretation module 320 converts one or more semantic tokens into topics selected from the catalog of topics stored in the topic store 122. Some semantic tokens may be unambiguously converted into topics. In the example above, "immaterialism" is a semantic token that corresponds to a single topic: Immaterialism. However, other semantic tokens have a referent that is ambiguous without context. For example, the semantic token "Berkeley" may refer to the eighteenth century Irish philosopher or the university in northern California. For a semantic token with an ambiguous referent, the topic interpretation module 320 determines a set of possible topics to which the semantic token may correspond. The semantic token "Berkeley" may be converted into a set of possible topics: George Berkeley (Philosopher) and UC Berkeley (University). The topic interpretation module 320 selects an appropriate topic from the set of possible topics based on context in each possible topic is used.

In one embodiment, the context for a topic is presented by a context value map. A context value map for a given topic comprises a mapping between a set of semantic tokens and a set of confidence values. For example, if a topic T has a context value map in which a semantic token S mapped to a confidence value V, the value V indicates the quality of co-occurrences of the topic T and the semantic token S. The confidence value V may be an estimate of a likelihood, e.g., a Bayesian likelihood, that a content item (e.g., a news article) or a user-generated comment on the content item relates to the topic T given that the content item or the comment includes the semantic token S. Alternately, the confidence value V can be an estimate of a likelihood that the semantic token S and the topic T both occur in a content item or comment on the content item if either the semantic token S or the topic T occurs in the content item or comment.

The context value map may be derived a posteriori by analyzing the co-occurrence of semantic tokens and topics as well as syntactical relationships between a topic and semantic tokens in data such as web pages, online encyclopedias, books, user-generated comments, and content items collected by the digital magazine server 110. For simplicity, each topic is described herein as having a single context value map. However, in alternate embodiments, each topic may have a first context value map for content items on the topic and a second context value map for user-generated comments on the topic.

Using the example above, for a set of possible topics (e.g., {George Berkeley (Philosopher), UC Berkeley (University)}), the topic interpretation module 320 determines the appropriate topic based on the context value map of each of the possible topics and the semantic tokens parsed from the surrounding text. The topic interpretation module 320 may compute a numeric score for each of the possible topics. In the example above, George Berkeley (Philosopher) has, in general, have a higher numeric score than UC Berkeley (University) because the context value map of George Berkeley (Philosopher) has a high confidence value for the topic Immaterialism, whereas UC Berkeley (University) does not. Accordingly, the topic interpretation module 320 determines that the ambiguous semantic token Berkeley (noun) refers to the topic George Berkeley (Philosopher).

After each sentence of the text of a content item (e.g., content item 200) is converted into a tuple of semantic tokens with disambiguated topics, the topic extraction module 330 determines a set of related topics $\{T_1, \ldots, T_N\}$ for the content item 200 and a set of weights $\{W_1, \ldots, W_N\}$ for each topic. The weight (e.g., $W_i$) of each topic (e.g., $T_i$) comprises an estimate of the degree to which the content item 200 relates to the topic. The topic extraction module 330 may select the related topics $\{T_1, \ldots, T_N\}$ from among the set of all topics $\{T_1, \ldots, T_K\}$ identified for the content item 200, which include topics not explicitly occurring in the content item 200. In some embodiments, the topic extraction module 330 computes, for each topic $T_k$ ($1 \leq k \leq K$) in the set of all topics $\{T_1, \ldots, T_K\}$, a score $S_k$ based on the number of occurrences of the topic $T_k$ or occurrences of topics and semantic tokens related to topic $T_k$. The topic extraction module 330 selects the related topics $\{T_1, \ldots, T_N\}$ by selecting the topics from the set of all topics $\{T_1, \ldots, T_K\}$ with scores higher than a threshold value. The weights $\{W_1, \ldots, W_N\}$ of each topic may be based on the scores of the respective topics.

Determination of Topics of Comment Threads

Figure 4:
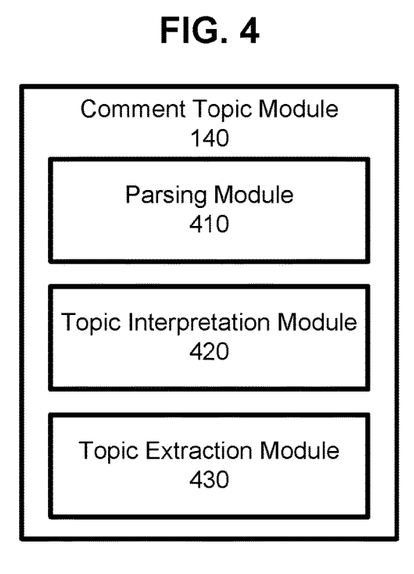
FIG. 4 is an example of a comment topic module according to one embodiment.

Returning back to FIG. 1, the comment topic module 140 determines a topic of a comment thread that includes one or more comments on content items. FIG. 4 illustrates a comment topic module 140 according to one embodiment. The comment topic module 140 of FIG. 4 includes a parsing module 410, a topic interpretation module 420, and a topic extraction module 430. Other embodiments may include additional or different modules than those shown by FIG. 4

Similar to the parsing module 310 of the content topic module 130, the parsing module 410 parses the comments in a comment thread into tuples of semantic tokens. In some embodiments, the parsing module 410 parses each comment into a tuple of sentences and parses each sentence into a tuple of semantic tokens. The parsing module 410 may identify the part of speech (e.g., verb, noun, conjunction) of each semantic token and determine the syntactical relationships between semantic tokens.

Similar to the topic interpretation module 320 of the content topic module 130, the topic interpretation module 420 converts some of the semantic tokens identified by the parsing module 410 into topics. The topic interpretation module 420 disambiguates between ambiguous topics based on the context of each ambiguous topic, e.g., comparing the numeric scores commuted for each ambiguous topic based its context. Alternatively, the topic interpretation module 420 analyzing the associations of the ambiguous topics and their corresponding content items commented by the comments of the comment thread, and selects the topic for the comment thread based on the topics of the content item with which that the comment is associated.

The topic interpretation module 420 may also disambiguate between topics in a first comment based on other comments associated with the first comment in the hierarchical structure of comments. For example, the semantic tokens in the parent of a comment are weighed more than the semantic tokens in a child or descendent of the comment. A comment originating from the same user as the comment with an ambiguous topic may also be weighted more than comments originating from comments of other users. In some embodiments, semantic tokens in comments in the same comment thread are weighed more than semantic tokens in comments from a different comment thread.

The topic interpretation module 420 may also disambiguate between topics in a comment based on other factors, such as the timestamp of the comment and the URL address of the content item being commented by a particular comment. For example, a comment posted around the same time as another comment in the same comment thread is more likely to be related to the same topic of the another comment. Similarly, two comments in a same comment thread commenting on content items provided by a same publisher are more likely to be related to a same or similar topic.

The topic extraction module 430 determines a topic for each comment thread based on the parsing of the comments in the thread by the parsing module 410 and the topics identified by the topic interpretation module 420. Similar to the topic extraction module 330 of the content topic module 130, for each of a number of candidate topics, the topic extraction module 430 selects a topic for the thread based on the number of occurrences of the topic and the number of occurrences of related topics and related semantic tokens in the comments of the thread. In some embodiments, the topic extraction module 430 selects multiple topics for each comment thread.

In some embodiments, the topic extraction module 430 selects a set of candidate topics from the topics identified for a comment thread and compares the set of candidate topics for the comment thread with the set of topics of the content item associated with the comment thread. Based on the comparison, the topic extraction module 430 selects a topic that is same or similar to the topic of the content item. In some embodiments, the topic extraction module 430 selects multiple topics as the topics of the comment thread. In one embodiment, the topic extraction module 430 determines the relevance between each pair of a candidate topic selected from a set of candidate topics for the comment thread and a topic selected from the set of topics of the content item. The candidate topics can be topics identified in the comment thread by the parsing module 410 and the topic interpretation module 420. Based on the relevance scores of the candidate topics for the comment thread, the topic extraction module 430 selects one or more candidate topic with the highest relevance scores as topics for the comment thread. In some embodiments, multiple individual comment thread can be joined into a single composite comment thread, which includes some or all of the comments from the individual comment thread after the topic extraction module 430 extracts related topics for each comment thread. For example, comment threads with a same or similar related topic may be combined.

Topic Thread Creation

Figure 5:
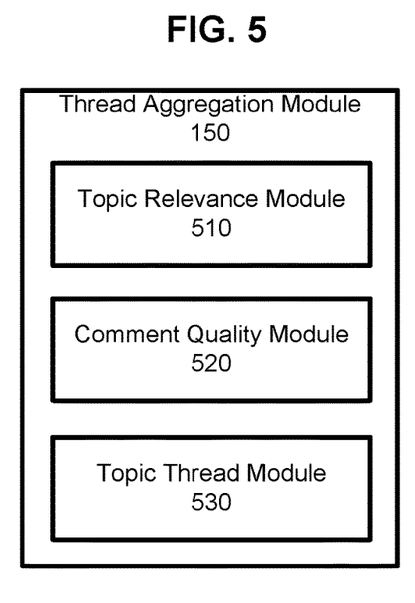
FIG. 5 is an example of a thread aggregation module according to one embodiment.

Returning back to FIG. 1, the thread aggregation module 150 generates a topic thread for a selected topic $T_t$ by aggregating threads of comments on content items presented to a user. For example, the thread aggregation module 150 selects a topic based on a user search query for a content item received by the digital magazine server 110, gathers comments threads associated with the selected topic, and generates a topic thread by aggregating the gathered comment threads based on multiple aggregating factors. FIG. 5 illustrates an example of a thread aggregation module 150 according to one embodiment. The thread aggregation module 150 includes a topic relevance module 150, a comment quality module 520, and a topic thread module 530.

The topic relevance module 510 compares the relevance of the topics of comment threads to the selected topic $T_t$. The topic relevance module 510 determines a topic relevance score for each gathered comment thread. In one embodiment, the topic relevance score for a comment thread with respect to the selected topic $T_t$ is determined based on a measure of similarity between a vector of semantic tokens of the topic for the comment thread and a vector of semantic tokens of the selected topic $T_t$. Example measures of similarity include cosine similarity or the generalized Euclidean distance between the vector associated with the comment thread and the vector associated with the selected topic $T_t$. Based on the topic relevance scores associated with the comment threads, the topic relevance module 510 ranks the comments threads in a descending order in accordance to the topic relevance scores of the comment threads.

The comment quality module 520 determines the quality of each thread of comments based on the characteristics of each comment thread. Examples of characteristics of a comment thread include a number of comments in the thread, timestamps of the comments, sources of the comments, lengths of the comments, appropriateness of the comments, and social relationships between the users who posted the comments. In one embodiment, the comment quality module 520 determines a quality score for each comment thread by evaluating the characteristics of the comment thread individually or in combination. For example, a comment thread having a large number of more recent comments is determined to have a higher quality score than another comment thread having many old comments. For another example, a comment thread has a large number of comments than another comment thread having fewer comments gets a higher quality score. For yet another example, a comment thread has less profanity, slurs, misspellings, and syntactic errors in comments is determined to have better quality than another comment thread having more of such inappropriate content. The quality score of a comment thread may be further evaluated based on the number of users who "like", "dislike", or "report" the comments in the thread. The comment quality module 520 determines a quality score for each comment thread based on the combination of the characteristics of the comment thread, e.g., by computing a weighted quality score based on the weights associated to each individual characteristic of the comment thread. Based on the quality scores of the comment threads, the comment quality module 520 ranks the comment threads.

The topic thread module 530 generates a topic thread from the comment threads gathered for the selected topic by aggregating the comment threads. In one embodiment, the topic thread module 530 can aggregate the comment threads based on the topic relevance scores associated with the comment threads. For example, the topic thread module 530 compares the topic relevance score of a comment thread with a threshold score and selects the comment thread as a subthread of the topic thread in response to the topic relevance score of the comment thread exceeding the threshold score. Similarly, the topic thread module 530 can aggregate the comment threads based on the quality scores associated with the comment threads and select a threshold number of comment threads based on the quality scores of comment threads. To consider both the relevance of topics of the comment threads with the selected topic and qualities of the comment threads, the topic thread module 530 generates a ranking score for each comment thread by adding a normalized relevance score and a normalized quality score associated with each comment thread, and selects a number of comment threads as the subthreads of the topic thread.

To further improve the efficiency of aggregation, the topic thread module 530 processes the comment threads before aggregation, e.g., by combining two more comment threads having a same or similar topic into a single composite comment thread and recalculates the quality score for the composite comment. The topic thread module 530 presents the topic thread, its subthreads and corresponding comments in the subthreads to the client 180 for presentation.

Figure 6:
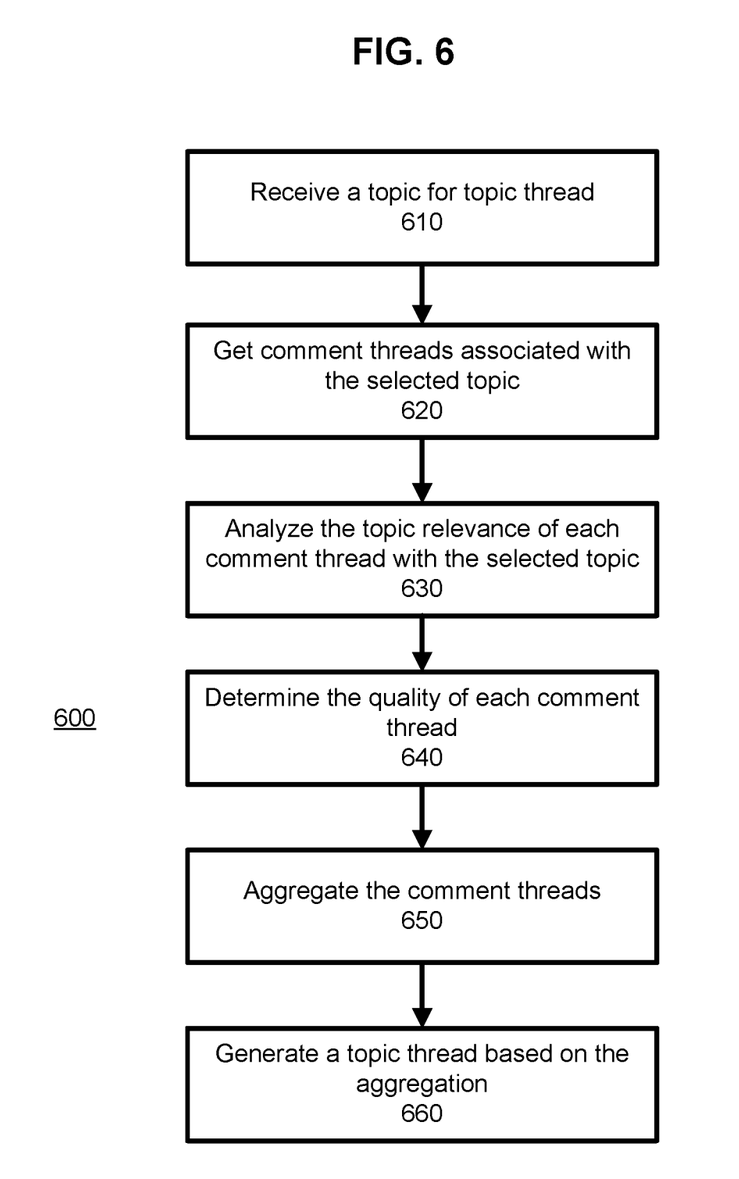
FIG. 6 is a flowchart of an example process for generating a topic thread for a selected topic according to one embodiment.

FIG. 6 is a flowchart of an example process for generating a topic thread on a selected topic by the digital magazine server 110 according to one embodiment. In one embodiment, the topic thread aggregation process 600 is performed by the thread aggregation module 150 of the digital magazine server 110. Initially, the topic aggregation module 150 receives 610 a thread topic $T_t$ for a topic thread to be created by the digital magazine server 110. The thread topic $T_t$ may be a topic selected from the catalog of topics stored in the topic store 122 of the digital magazine server 110 based on the most recent events observed by the digital magazine server 110. In some embodiments, the received thread topic $T_t$ is extracted from a request to the digital magazine server 110 from a user for a content item or based on a topic in which the user has indicated interest.

The thread aggregation module 150 gets 620 multiple comment threads associated with the thread topic $T_t$, where each comment thread has one or more comments on the content item commented by the comments in the comment thread. Using the content item 200 illustrated in FIG. 2, the thread aggregation module 150 retrieves the comment threads 250 from the content store 125. The thread aggregation module 150 analyzes 630 the relevance of topic of each comment thread to the thread topic $T_t$. For example, the topic relevance module 510 of the thread aggregation module 150 computes a topic relevance score for each comment thread and ranks the comment threads according to the corresponding topic relevance scores.

The thread aggregation module 150 determines 640 the quality of each comment thread based on one or more characteristics of each comment thread. The thread aggregation module 150 aggregates 650 the comment threads based on one or more aggregation factors, such as the topic relevance scores and quality scores of the comment threads, and generates 660 a topic thread by selecting a threshold of comment threads as the subthreads of the topic thread based on the aggregation. The digital magazine server 110 presents the topic thread, its subthreads and comments in the subthread to the client 180 of the user for presentation.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for generating a topic thread of a digital magazine, the method comprising:
   receiving a topic for the topic thread, the topic having at least one content item associated with the topic;
   retrieving a plurality of comment threads related to the received topic, each comment thread having a topic and a plurality of user-generated comments;
   for each comment thread of the plurality of comment threads:
      determining relevance of the topic of the comment thread with respect to the received topic, and
      determining quality of the comment thread based on a plurality of quality factors;
   generating a quality score for each comment thread of the plurality of comment threads based on the timestamps of comments in the comment thread, wherein a comment thread having comments with more recent timestamps has a higher quality score than another comment thread having comments posted earlier than a predefined cutoff time and based on the number of comments in the comment thread, wherein a comment thread having a larger number of comments has a higher quality score than another comment thread having a less number of comments; and selecting one or more comment threads from the plurality of comment threads in response to the quality scores of the one or more comment threads exceeding a threshold quality value, the topic thread comprising the one or more selected comment threads.

2. The method of claim 1, further comprising:
generating the topic thread for a user, the generated topic thread comprising the selected comment threads and corresponding comments in each selected comment thread; and
presenting the topic thread in a digital magazine to the user.

3. The method of claim 1, wherein aggregating the plurality of comment threads comprises:
generating a topic relevance score for each comment thread of the plurality of comment threads; and
selecting a comment thread from the plurality of comment threads in response to the topic relevance score of the comment thread exceeding a threshold relevance value.

4. The method of claim 1, wherein aggregating the plurality of comment threads comprises:
generating a weighted quality score for each comment thread of the plurality of comment threads based on at least two of the quality factors, each quality factors of the plurality of quality factors having a weight; and
selecting a comment thread from the plurality of comment threads in response to the weighted quality score of the comment thread exceeding a threshold value.

5. The method of claim 1, wherein the plurality of quality factors associated with a comment thread comprises the following:
a number of comments in the comment thread;
timestamps of comments in the comment thread;
sources of comments in the comment thread;
lengths of comments in the comment thread;
presence of inappropriate content of comments in the comment thread; and
social relationship between users who posted comments in the comment thread, the social relationship between users being determined in context of a social networking system.

6. The method of claim 1, further comprising determining a topic of a comment thread of the plurality of comment threads.

7. The method of claim 6, wherein determining a topic of a comment thread comprises:
parsing the text of each comment of the comment thread into a plurality of tuples comprising one or more semantic tokens;
determining a topic for each semantic token based on the context in which the semantic token appears; and
selecting a topic of the comment thread based on analysis of the topics associated with the comments in the comment thread.

8. A non-transitory computer-readable storage medium storing executable computer program instructions for generating a topic thread of a digital magazine, the computer program instructions when executed by a computer processor cause the computer processor to perform steps comprising:

receiving a topic for the topic thread, the topic having at least one content item associated with the topic;
retrieving a plurality of comment threads related to the received topic, each comment thread having a topic and a plurality of user-generated comments;
for each comment thread of the plurality of comment threads:
determining relevance of the topic of the comment thread with respect to the received topic, and
determining quality of the comment thread based on a plurality of quality factors;
generating a quality score for each comment thread of the plurality of comment threads based on the timestamps of comments in the comment thread, wherein a comment thread having comments with more recent timestamps has a higher quality score than another comment thread having comments posted earlier than a predefined cutoff time and based on the number of comments in the comment thread, wherein a comment thread having a larger number of comments has a higher quality score than another comment thread having a less number of comments; and
selecting one or more comment threads from the plurality of comment threads in response to the quality scores of the one or more comment threads exceeding a threshold quality value, the topic thread comprising the one or more selected comment threads.

9. The non-transitory computer-readable storage medium of claim 8, further comprising computer program instructions for:
generating the topic thread for a user, the generated topic thread comprising the selected comment threads and corresponding comments in each selected comment thread; and
presenting the topic thread in a digital magazine to the user.

10. The non-transitory computer-readable storage medium of claim 8, wherein aggregating the plurality of comment threads comprises:
generating a topic relevance score for each comment thread of the plurality of comment threads; and
selecting a comment thread from the plurality of comment threads in response to the topic relevance score of the comment thread exceeding a threshold relevance value.

11. The non-transitory computer-readable storage medium of claim 8, wherein aggregating the plurality of comment threads comprises:
generating a weighted quality score for each comment thread of the plurality of comment threads based on at least two of the quality factors, each quality factors of the plurality of quality factors having a weight; and
selecting a comment thread from the plurality of comment threads in response to the weighted quality score of the comment thread exceeding a threshold value.

12. The non-transitory computer-readable storage medium of claim 8, wherein the plurality of quality factors associated with a comment thread comprises the following:
a number of comments in the comment thread;
timestamps of comments in the comment thread;
sources of comments in the comment thread;
lengths of comments in the comment thread;
presence of inappropriate content of comments in the comment thread; and
social relationship between users who posted comments in the comment thread, the social relationship between users being determined in context of a social networking system.

13. The non-transitory computer-readable storage medium of claim 8, further comprising computer program instructions for determining a topic of a comment thread of the plurality of comment threads.

14. The non-transitory computer-readable storage medium of claim 13, wherein determining a topic of a comment thread comprises:
- parsing the text of each comment of the comment thread into a plurality of tuples comprising one or more semantic tokens;
- determining a topic for each semantic token based on the context in which the semantic token appears; and
- selecting a topic of the comment thread based on analysis of the topics associated with the comments in the comment thread.

15. A computer-implemented method for generating a topic thread of a digital magazine, the method comprising:
- receiving a topic for the topic thread, the topic having at least one content item associated with the topic;
- retrieving a plurality of comment threads related to the received topic, each comment thread having a topic and a plurality of user-generated comments;
- for each comment thread of the plurality of comment threads:
  - determining relevance of the topic of the comment thread with respect to the received topic, and
  - determining quality of the comment thread based on a plurality of quality factors, the plurality of quality factors associated with a comment thread comprising: a number of comments in the comment thread, timestamps of comments in the comment thread, wherein a comment thread having a larger number of comments has a higher quality score than another comment thread having a less number of comments, sources of comments in the comment thread, lengths of comments in the comment thread, presence of inappropriate content of comments in the comment thread, and social relationship between users who posted comments in the comment thread, the social relationship between users being determined in context of a social networking system;
- aggregating the plurality of comment threads based on at least one of the determined relevance and the determined quality for each comment thread; and
- selecting one or more comment threads from the plurality of the comment threads based on the aggregating of the plurality of comment threads, the topic thread comprising the one or more selected comment threads.

16. The method of claim 15, further comprising:
- generating the topic thread for a user, the generated topic thread comprising the selected comment threads and corresponding comments in each selected comment thread; and
- presenting the topic thread in a digital magazine to the user.

17. A non-transitory computer-readable storage medium storing executable computer program instructions for generating a topic thread of a digital magazine, the computer program instructions when executed by a computer processor cause the computer processor to perform steps comprising:
- receiving a topic for the topic thread, the topic having at least one content item associated with the topic;
- retrieving a plurality of comment threads related to the received topic, each comment thread having a topic and a plurality of user-generated comments;
- for each comment thread of the plurality of comment threads:
  - determining relevance of the topic of the comment thread with respect to the received topic, and
  - determining quality of the comment thread based on a plurality of quality factors, the plurality of quality factors associated with a comment thread comprising: a number of comments in the comment thread, timestamps of comments in the comment thread, wherein a comment thread having a larger number of comments has a higher quality score than another comment thread having a less number of comments, sources of comments in the comment thread, lengths of comments in the comment thread, presence of inappropriate content of comments in the comment thread, and social relationship between users who posted comments in the comment thread, the social relationship between users being determined in context of a social networking system;
- aggregating the plurality of comment threads based on at least one of the determined relevance and the determined quality for each comment thread; and
- selecting one or more comment threads from the plurality of the comment threads based on the aggregating of the plurality of comment threads, the topic thread comprising the one or more selected comment threads.

18. The non-transitory computer-readable storage medium of claim 17, further comprising computer program instructions for:
- generating the topic thread for a user, the generated topic thread comprising the selected comment threads and corresponding comments in each selected comment thread; and
- presenting the topic thread in a digital magazine to the user.

* * * * *